Oct. 26, 1965  A. A. STRICKER ETAL  3,214,060
APPARATUS FOR FEEDING MINUTE ARTICLES
Filed June 9, 1961  4 Sheets-Sheet 1

INVENTOR
ALFRED A. STRICKER
FRANK H. MASTERSON

BY *John L. Sterling*

ATTORNEY

Oct. 26, 1965    A. A. STRICKER ETAL    3,214,060
APPARATUS FOR FEEDING MINUTE ARTICLES
Filed June 9, 1961    4 Sheets-Sheet 4

United States Patent Office 3,214,060
Patented Oct. 26, 1965

3,214,060
APPARATUS FOR FEEDING MINUTE ARTICLES
Alfred A. Stricker, Kingston, and Frank H. Masterson, Poughkeepsie, N.Y., assignors to International Business Machines Corporation, New York, N.Y., a corporation of New York
Filed June 9, 1961, Ser. No. 115,978
1 Claim. (Cl. 221—200)

This invention relates to article feeding and more particularly to apparatus for feeding minute pellets of soft material.

In the feeding of small pellets such as those used in transistors and the like, there is a tendency for them to become packed when stored in any quantity, particularly when feeding pellets or dots of indium such as those used in the manufacture of transistors by an automated assembly line. Indium is a comparatively soft metal and when a pellet of this material is allowed to stand, it flattens out or takes the shape of the surface on which it is resting. This causes flattening of one or more surfaces and leads to packing. Is also results in a change of diameter which brings about considerable difficulty in feeding. Vibrators and the like have been used in the past to separate the dots and prevent their deformation but this has met with indifferent success. Indium also oxidizes very quickly when exposed to air.

It therefore is the principal object of this invention to provide a feeder that will maintain a plurality of units in a container in constant motion and thus permit the selection of one unit.

Another object is to provide a feeder that will select one of a group of units and position it for feeding.

A further object is to provide a fluid feed for pellets which will select one pellet from a group and feed it to a preselected position.

A still further object is to provide fluid means for maintaining a plurality of units in a container in constant motion and thereby minimize packing and so facilitate feeding.

Another object is to provide a fluid which will exclude air thus preventing oxidation.

The foregoing and other objects, features and advantages of the invention will be apparent from the following more particular description of the preferred embodiment of the invention, as illustrated in the accompanying drawings.

In the manufacture of transistors by an automated assembly line it is necessary to feed pellets or dots of contaminating metals such as indium into a boat in which the fusing process is carried out. Indium is a comparatively soft metal having the consistency of putty and tends to take the shape of the surface on which it rests if allowed to remain stationary. This causes flattening of one or more surfaces of the dot which leads to packing. It also oxidizes readily when exposed to air. The invention uses a stream of gas in a vibrating magazine for maintaining the dots in constant motion and floats each pellet in a bath of gas preventing them from packing and oxidizing. The jet is also used to isolate all but one of a plurality of dots and feed that one dot into a boat.

Figure 1:
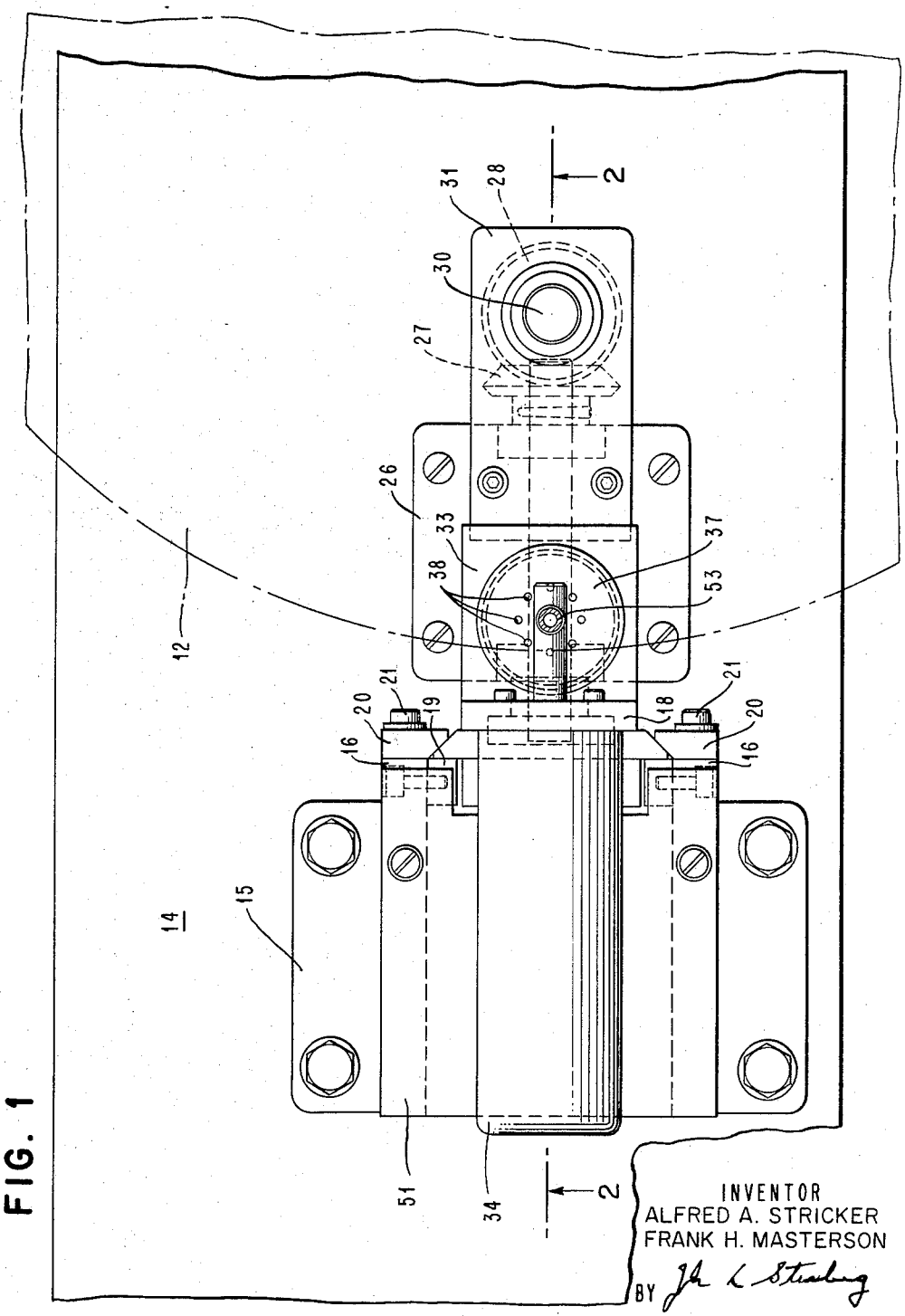
FIG. 1 is a plan view of the device embodying the invention.
Figure 2:
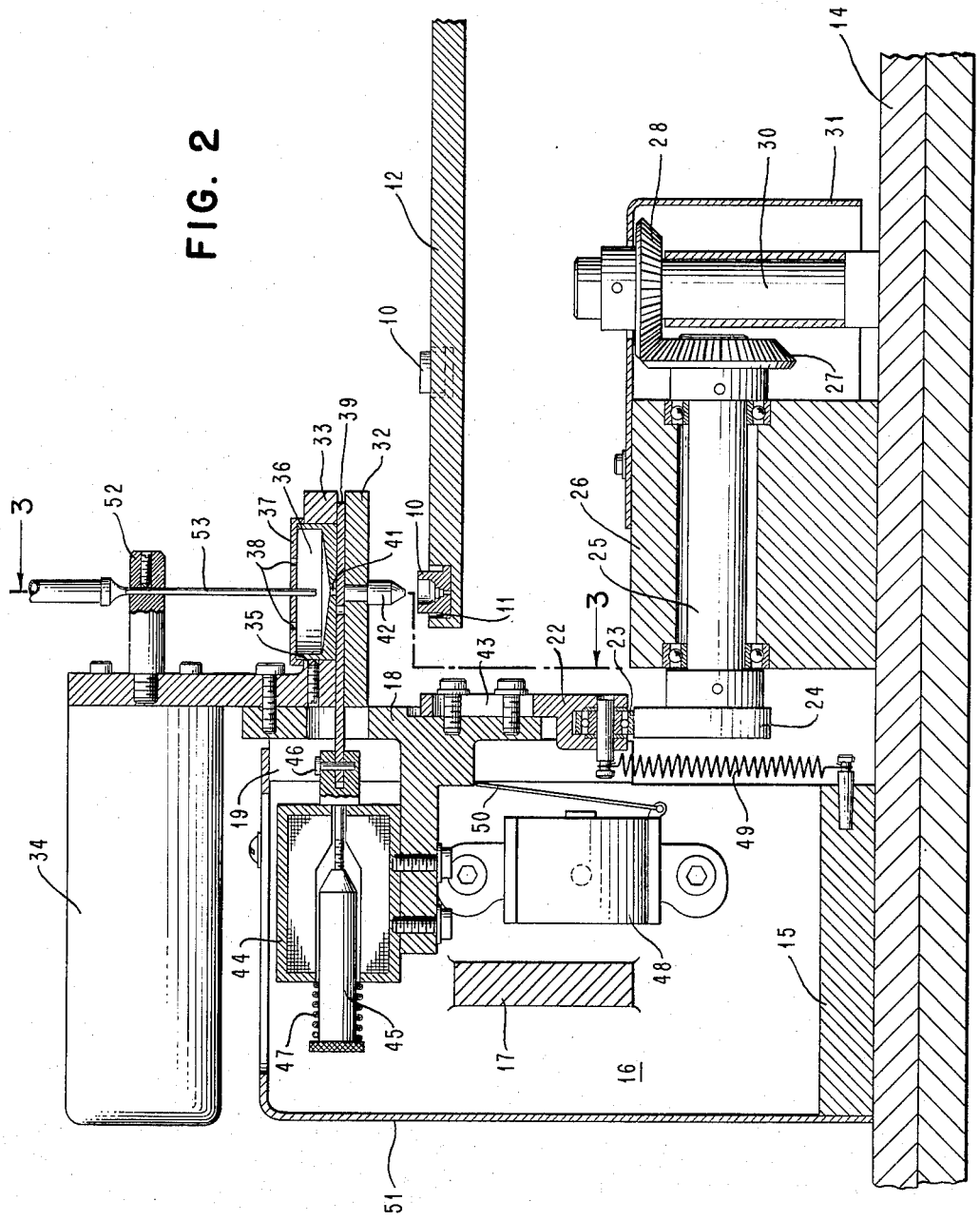
FIG. 2 is a cross section taken along line 2—2 of FIG. 1 showing the operating mechanism in detail.

The parts of the transistor are assembled in a carbon boat 10 carried in a socket 11 formed in a rotating table 12 only a portion of which is shown in FIG. 2. The table and feeder are mounted on a common base 14. An H shaped frame comprising a base 15, two side members 16 and a cross bar 17 is fastened to the base 14 and carries the feeder. Secured to the inner edges of side members 16 are slides 19. These are machined to form ways for a T shape casting 18. The edges of the casting 18 are chamfered to cooperate with the chamfered edges on a pair of plates 20 bolted to the faces of the members 16 by bolts 21. The chamfered faces on the casting 18 and the plates 20 form a guideway which permits the vertical reciprocatory motion of the casting under control of a cam drive. Adjustably secured to the casting 18 is a Y-shaped block 22 having a roller 23 journalled between the arms thereof. The roller cooperates with a cam 24 secured to a shaft 25 journalled in a block 26 and driven through miter gears 27 and 28 by shaft 30, the drive of which is not shown. This drive is synchronized with the drive for rotating the table 12. A cover 31 encloses the gears 27 and 28.

Secured to the casting 18 is an L shaped member 33 having a vibrator 34 secured to the vertical leg thereof. The horizontal leg of the member 33 (FIG. 4) is formed with a pocket 35 to accommodate a transparent magazine 36 having a cover 37 provided with perforations 38. The bottom of magazine 36 is funnel shaped toward a central aperture (FIG. 6) of a size to accommodate a single pellet 40 having a diameter in the range of ten to fifteen thousandths.

An arcuate slot 29 milled in the base of magazine 36 is so located with relation to the direction of vibration that a number of the pellets are aligned in a train that travels across aperture 41. This insures that a pellet will always drop in the aperture. The slot also tends to break up any bunching of the pellets.

Figure 3:
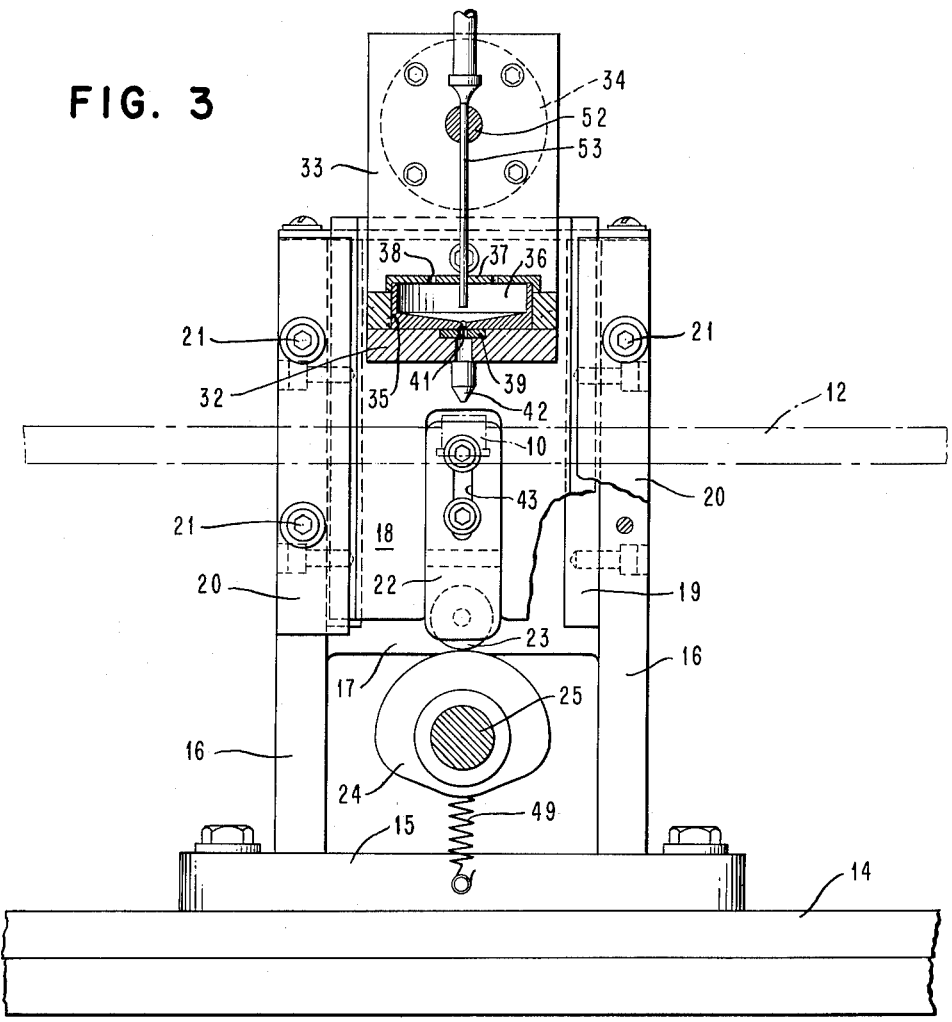
FIG. 3 is a cross section taken along line 3—3 of FIG. 2.
Figure 4:
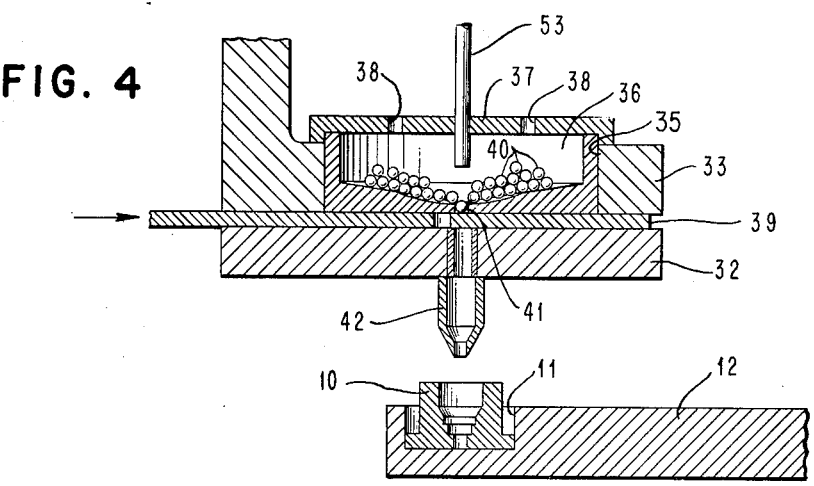
FIG. 4 is an enlarged detail view of the storage chamber and feed nozzle in normal position.

Slidably mounted in a slot formed in a plate 32 secured to the bottom of the horizontal arm of member 33 is an apertured slide 39 that acts as a gate for the feed mechanism. Aligned with the aperture 41 is a tube 42 formed as shown in FIG. 4 which acts to guide a pellet into one of the boats 10. Since these boats may be of different size and shape the travel of the casting or slide 18 must be adjustable to a height that will permit free rotation of the table 12 when the casting is in the uppermost position. The slide 18 is adjusted by first placing the cam 24 in its high position i.e., that shown in FIG. 3. The bolts holding block 22 are then loosened and with the roller 23 in contact with cam 24 as shown in FIG. 3, the slot 43 will permit the slide 18 to be so positioned that the tip of tube 42 will clear the rim of a boat 10 as seen in FIG. 2 after which the bolts are again tightened. A spring 49 holds the roller 23 in contact with the cam 24.

Secured to the horizontal arm casting 18 is a solenoid 44, the plunger 45 of which is secured to the slide 39 by a clevis and pin connection 46. A spring 47 holds the plunger retracted when the solenoid is unoperated. The amount of movement necessary to the alignment of the aperture in slide 39 with aperture 41 is obtained by adjusting the clevis 46 with relation to the plunger 45.

Mounted on one end of the side members 16 is electromagnet 48 having an armature 50 which acts to prevent the lowering of the casting 18 should there be no boat on the table 12. It is operated by circuitry to be described later. Should a boat be missing, the magnet will not be actuated as the casting 18 starts to descend.

Armature 50 will engage the underside of the horizontal arm of casting 18 preventing it from descending. A casing 51 encloses the electromagnet 48 and solenoid 44 between the side members 16.

Adjustably secured in a post 52 secured in the vertical arm of the L shaped member 33 is a nozzle 53 which is connected through an electro-mechanical valve to a supply of gas under pressure.

Figure 5:
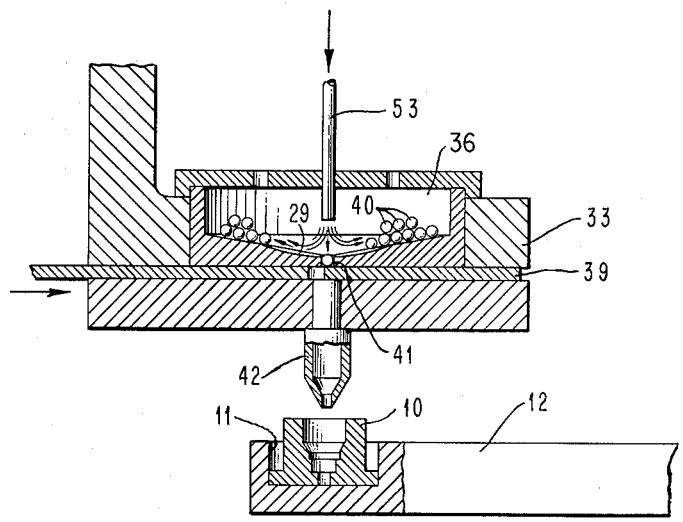
FIG. 5 is a detail similar to FIG. 4 showing one pellet in selected position.
Figure 6:
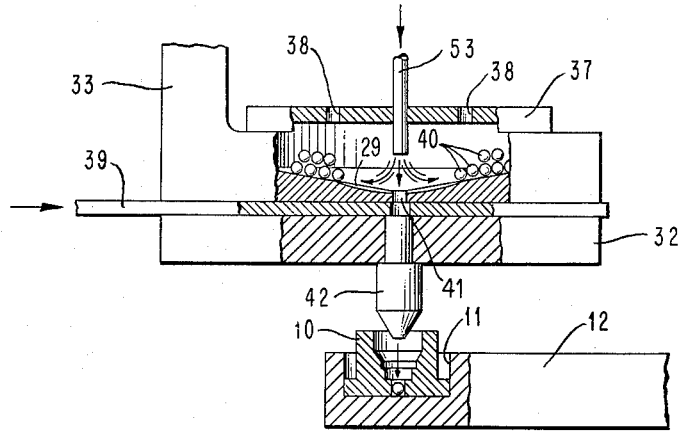
FIG. 6 is a detail similar to FIG. 4 showing a pellet fed to a preselected position.

In operation a load of pellets is placed in the magazine 36 as shown in FIG. 4 and the gas is introduced through nozzle 53. This jet blows all but one pellet 40 (FIG. 5) which has travelled down slot 29 and fallen into aperture 41, to the sides of the magazine and keeps them constantly in motion and bathed in the gas to prevent oxidation. Rotation of shaft 25 rotates cam 24 permitting a spring 49 to lower the casting 18 as shown in FIG. 6 thus lowering the tip of nozzle 42 into the boat 10. At approximately the same time, the solenoid 44 is operated drawing slide 39 to the position of FIG. 6 where the jet of gas ejects the pellet 40 in aperture 41 into the bottom of the boat and prevents the remaining pellets from leaving the magazine.

As the turntable rotates each pocket 11 passes through a sensing station that determines if there is a boat present. If so, a storage relay S, FIG. 7, operates closing contacts S1, S2 and S3 and maintaining them closed from approximately 200 degrees of one cycle to 190 degrees of the next cycle. It no boat is present, this relay sets up a condition wherein slide 39 is not actuated, the nozzle 53 is disabled and magnet 48 is not operated. The fact that magnet 48 is not operated leaves the armature 50 in the path of slide 18 preventing it from descending and therefore no pellet is fed.

With the S relay operated, an operating circuit is closed under control of contact breaker cams on the drive for shaft 30. These are well known and therefore are not shown. They are held closed for designated periods by cams having the required configuration.

Figure 7:
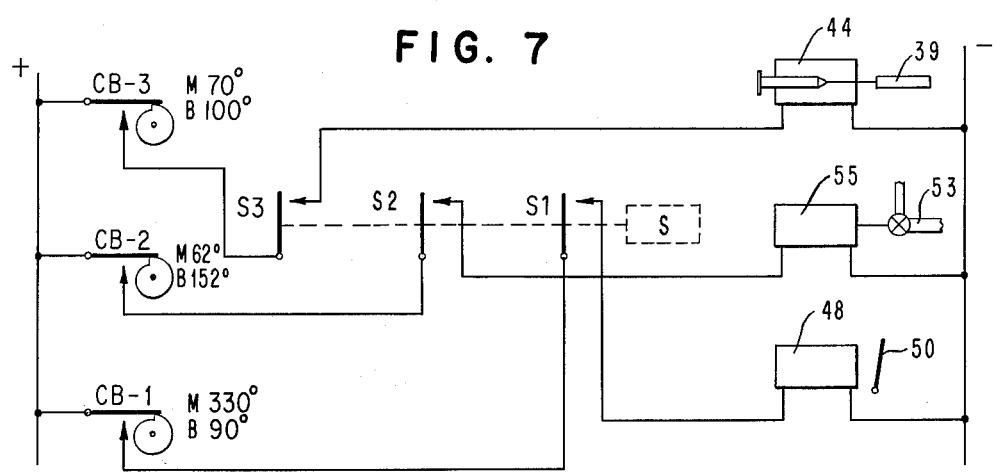
FIG. 7 is a schematic showing of the electrical circuit for the invention.

In the circuit shown in FIG. 7 contact breaker CB1 is closed from approximately 330 degrees of one cycle to 90 degrees of the next cycle. During that time, a circuit is maintained from positive current through CB1, contact S1 of the storage relay S, winding of magnet 48 to negative. This removes the armature 50 from the path of the slide 18 permitting it to descend. At approximately 62 degrees a circuit is closed through CB2, contact S2, and winding of solenoid 55 opening the jet to admit the gas and disperse the pellets in the magazine. This jet is maintained until about 152 degrees at which time solenoid 55 is released shutting off the jet.

At approximately 70 degrees CB-3 closes a circuit through contact S-3 and winding of solenoid 44 which in operating pushes the slide 39 to the position of FIG. 6 opening orifice 41 to nozzle 42. At about 100 degrees of the present cycle the circuit breaker CB-3 is opened releasing solenoid 44 and spring 47 moves the slide to the position of FIG. 4.

While the invention has been particularly shown and described with reference to a preferred embodiment thereof, it will be understood by those skilled in the art that the foregoing and other changes in form and details may be made therein without departing from the spirit and scope of the invention.

What is claimed is:

In a feeder for minute pellets of highly oxidizable material:
  a funnel-shaped magazine having an orifice in the tip thereof,
  a slot extending diametrically across the base of said magazine and communicating with said orifice to guide pellets toward said orifice,
  a slide normally closing said orifice to retain one of said pellets in said orifice,
  an aperture in said slide not in alignment with said orifice when in normal position,
  a nozzle positioned to direct a jet of highly non-oxidizable gas under pressure toward said orifice,
  means for periodically controlling said jet to disperse said pellets about the periphery of said magazine to prevent packing,
  means for vibrating said magazine to align pellets in said slot,
  means for shifting said slide to align said aperture with said orifice to permit said jet to eject said retained pellet, and
  circuit means for cyclically controlling said jet control means, vibrating means and slide shifting means.

References Cited by the Examiner

UNITED STATES PATENTS

| | | | |
|---|---|---|---|
| 702,218 | 6/02 | De Janisch | 221—278 |
| 873,268 | 12/07 | Raabe | 221—277 |
| 2,068,076 | 1/37 | Rosenberg | 221—289 X |
| 2,366,448 | 1/45 | Greene et al. | 221—279 X |
| 2,399,199 | 4/46 | Brandon | 221—289 X |
| 2,632,588 | 3/53 | Hoar. | |
| 2,738,899 | 3/56 | Hansen et al. | 221—278 X |
| 2,747,185 | 5/56 | Effgen | 221—178 X |
| 2,944,333 | 7/60 | Francis et al. | 221—175 X |
| 2,949,993 | 8/60 | Adler | 221—135 X |
| 3,039,531 | 6/62 | Scott | 221—278 X |
| 3,132,766 | 5/64 | Kerger | 221—278 X |

FOREIGN PATENTS

| | | |
|---|---|---|
| 1,055,615 | 10/53 | France. |
| 686,750 | 1/40 | Germany. |

LOUIS J. DEMBO, *Primary Examiner.*

KENNETH N. LEIMER, RAPHAEL M. LUPO,
*Examiners.*